United States Patent
Heo

(10) Patent No.: US 9,245,349 B2
(45) Date of Patent: Jan. 26, 2016

(54) METHOD AND APPARATUS FOR DETECTING EDGE IN IMAGE

(71) Applicant: SAMSUNG ELECTRONICS CO., LTD., Suwon-si, Gyeonggi-do (KR)

(72) Inventor: Jin Gu Heo, Yongin (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 14/157,127

(22) Filed: Jan. 16, 2014

(65) Prior Publication Data

US 2014/0212064 A1 Jul. 31, 2014

(30) Foreign Application Priority Data

Jan. 29, 2013 (KR) .................. 10-2013-0010026

(51) Int. Cl.
*G06K 9/40* (2006.01)
*G06T 7/00* (2006.01)

(52) U.S. Cl.
CPC ..... *G06T 7/0085* (2013.01); *G06T 2207/20028* (2013.01); *G06T 2207/20192* (2013.01)

(58) Field of Classification Search
CPC ........... G06T 5/001; G06T 5/002; G06T 5/20; G06T 2207/20182; G06T 2207/20192; G06T 7/0085; G06K 9/40; H04N 5/208; H04N 5/228; H04N 7/26888; H04N 1/4097
See application file for complete search history.

(56) References Cited

U.S. PATENT DOCUMENTS

| 5,424,783 | A | * | 6/1995 | Wong | 348/606 |
| 5,892,853 | A | * | 4/1999 | Hirani et al. | 382/280 |
| 6,721,448 | B2 | * | 4/2004 | Rao et al. | 382/164 |
| 8,004,588 | B2 | * | 8/2011 | Lukac | 348/252 |
| 8,953,877 | B2 | * | 2/2015 | Babacan | 382/163 |
| 2011/0019928 | A1 | * | 1/2011 | Naito | 382/225 |
| 2012/0314946 | A1 | | 12/2012 | Nomura et al. | |
| 2012/0321179 | A1 | | 12/2012 | Pomerantz | |
| 2014/0212064 | A1 | * | 7/2014 | Heo | 382/275 |

FOREIGN PATENT DOCUMENTS

JP 4998287 B2 5/2012
KR 10-2012-0134615 A 12/2012

OTHER PUBLICATIONS

S. Kiranyaz et al., "Automatic Object Extraction Over Multiscale Edge Field for Multimedia Retrieval," *IEEE Transactions on Image Processing*, vol. 15, No. 12, Dec. 2006, pp. 3759-3772.

(Continued)

*Primary Examiner* — Amir Alavi
(74) *Attorney, Agent, or Firm* — Harness, Dickey & Pierce, P.L.C.

(57) ABSTRACT

A method and apparatus for detecting an image edge that detects an edge area from an input image is disclosed. The method of detecting the image edge includes removing noise of an input image, generating an intermediate image in which an edge area is accentuated based on the input image and the input image from which the noise is removed, determining a threshold value to be applied to the intermediate image through clustering the pixels of the intermediate image, and detecting an edge area from the intermediate image based on the threshold value.

16 Claims, 6 Drawing Sheets

(56) References Cited

OTHER PUBLICATIONS

X. Changzhen et al., "An Adaptive Bilateral Filtering Algorithm and Its Application in Edge Detection," *2010 International Conference on Measuring Technology and Mechatronics Automation*, Mar. 2010, pp. 440-443.

S. Lee et al., "A Study on Illumination Normalization Method based on Bilateral Filter for Illumination Invariant Face Recognition," *Journal of the Institute of Electronics Engineers of Korea*, vol. 47; No. 4, 2010, pp. 420-426.

* cited by examiner

METHOD AND APPARATUS FOR DETECTING EDGE IN IMAGE

CROSS-REFERENCE TO RELATED APPLICATION

This application claims the priority benefit of Korean Patent Application No. 10-2013-0010026, filed on Jan. 29, 2013, in the Korean Intellectual Property Office, the disclosure of which is incorporated herein by reference.

BACKGROUND

1. Field

Example embodiments relate to a method and apparatus for detecting an image edge that detects an edge of an input image.

2. Description of the Related Art

An edge in image processing technology may refer to an area in which radical changes to a brightness of an image occur, and the radical changes in the brightness of the image may generally indicate that an object has a major change. Extracting an image edge may enable a predetermined object to be identified from an image, or enable estimation of an expression, an action, and a pose of a person.

A general image edge detection algorithm may calculate a brightness difference between pixels adjacent to an object pixel, and when the brightness difference is calculated to be great, use a scheme for detecting an object pixel as an edge. However, a brightness distribution of a digital image may not represent a smooth brightness distribution due to a presence of noise, and noise present in an image may pose a hindrance to obtaining an image edge accurately. An edge in an image may be perceived by considering a environmental brightness distribution comprehensively.

SUMMARY

The foregoing and/or other aspects are achieved by providing a method of detecting an image edge, the method including removing noise of an input image, generating an intermediate image in which an edge area is accentuated based on the input image and the input image from which the noise is removed, determining a threshold value to be applied to the intermediate image through clustering pixels of the intermediate image, and detecting an edge area from the intermediate image, based on the threshold value.

The method of detecting the image edge may further include correcting a resulting image based on a number of pixels configuring the edge area in the resulting image from which the edge area is detected.

The foregoing and/or other aspects are achieved by providing a method of detecting to an image edge, the method including applying a weight determined based on a location of a pixel and a pixel value of an input image to pixels of the input image, removing noise of the input image to which the weight is applied, using a Gaussian distribution, generating an intermediate image in which an edge area is accentuated based on the input image to which the weight is applied and the input image from which the noise is removed, and detecting an edge area from the intermediate image, based on a distribution of a pixel value of the intermediate image.

The foregoing and/or still other aspects are achieved by providing a method of detecting an image edge, the method including generating an input image from which noise is removed, generating an intermediate image representing a ratio between a pixel of an original input image and a pixel of the input image from which the noise is removed, and dividing the intermediate image into two groups based on a threshold value and generating a resulting image representing an edge area and a background area, wherein the threshold value is determined adaptively based on a distribution of a pixel for the pixels of the intermediate image.

The foregoing and/or other aspects are achieved by providing an apparatus for detecting an image edge, the apparatus including a noise removing unit to remove noise of an input image, an intermediate image generation unit to generate an intermediate image in which an edge area is accentuated, based on the input image and the input image from which the noise is removed, a threshold value determination unit to determine a threshold value to be applied to the intermediate image through clustering pixels of the intermediate image, and an edge area detection unit to detect an edge area from the intermediate image based on the threshold value.

The foregoing and/or other aspects are achieved by providing an apparatus for detecting an image edge, the apparatus including a noise removing unit to apply a weight determined based on a location of a pixel of an input image and a pixel value to pixels of the to input image, and remove noise of the input image to which the weight is applied, using a Gaussian distribution, an intermediate image generation unit to generate an intermediate image in which an edge area is accentuated based on the input image from which the noise is removed, and an edge area detection unit to detect an edge area from the intermediate image based on a distribution of a pixel of the intermediate image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
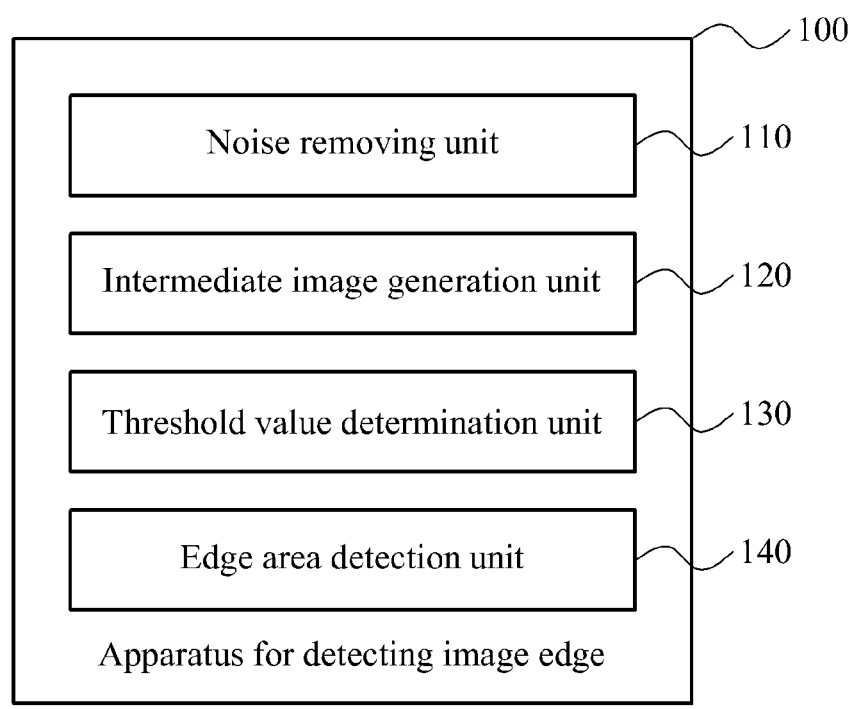
FIG. 1 illustrates a detailed configuration of an apparatus for detecting an image edge according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a detailed configuration of an apparatus 100 for detecting an image edge according to example embodiments.

The apparatus 100 for detecting the image edge may detect an edge from an input image. For example, the input image may include a color image, or a gray-scale image. The edge may represent, for example, a boundary or a shape of an object, and an expression or an action of a person.

The apparatus 100 for detecting the image edge may divide pixels of the input image into an edge area and a background area, for example, a remaining area aside from the edge area, thereby generating a binary image. The binary image generated by the apparatus 100 for detecting the image edge may be used in various fields, such as, for example, object recognition, expressions recognition, and location recognition.

Referring to FIG. 1, the apparatus 100 for detecting the image edge may include a noise removing unit 110, an intermediate image generation unit 120, a threshold value determination unit 130, and an edge area detection unit 140.

The noise removing unit 110 may remove noise of an input image. For example, the noise removing unit 110 may remove the noise of the input image through a Gaussian smoothing scheme using a Gaussian distribution. The noise removing unit 110 may remove the noise using the Gaussian smoothing scheme, and adjust an input image for easier detection of an edge area. A thickness of the edge area in the input image may be accentuated through the Gaussian smoothing scheme.

Also, the noise removing unit 110 may selectively perform pre-processing to remove the noise of the input image more securely. For example, the noise removing unit 110 may perform a bilateral filtering, prior to removing of the noise of the input image, using the Gaussian smoothing scheme.

The noise removing unit 110 may apply, to the pixels of the input image, a weight determined based on a location of a pixel and a pixel value of the input image during the bilateral filtering. The noise removing unit 110 may remove noise while preserving the edge area of the input image through the bilateral filtering.

The intermediate image generation unit 120 may generate an intermediate image in which an edge area is accentuated based on the input image and the input image from which the noise is removed. For example, the intermediate image generation unit 120 may generate an intermediate image representing a ratio between a pixel value of the input image and a pixel value of the input image from which the noise is removed.

The intermediate image generation unit 120 may divide the input image and the input image from which the noise is removed pixel-wise, and generate the intermediate image through dividing the pixel values of pixels corresponding to the input image and the input image from which the noise is removed. The pixel values may correspond to an intensity of pixels in an image.

For example, the intermediate image generation unit 120 may identify a pixel corresponding to the input image from the input image from which the noise is removed, and generate an intermediate image in which an edge area is accentuated through dividing pixel values of corresponding pixels. When an image representing brightness of the input image is "$I_1$", and an image representing brightness of the image from which the noise is removed is "$I_2$", an intermediate image generated by the intermediate image generation unit 120 may be represented as "$I_1/I_2$".

The intermediate image generation unit 120 may assign a lower pixel value to an edge area to be represented as darker, and assign a higher pixel value to a background area to be represented as brighter through such a process. Transitively, the intermediate image generation unit 120 may accentuate edge areas and areas adjacent to the edge areas in the input image.

The threshold value determination unit 130 may cluster pixels of an intermediate image based on brightness of a pixel to determine a threshold value, hereinafter a "first threshold value", to be applied to the intermediate image. The threshold value determination unit 130 may determine a pixel value to be used for dividing the pixels of the intermediate image into two groups to be the first threshold value to be applied to the intermediate image, based on a distribution of a pixel value of the intermediate image.

The first threshold value may be used as a reference for dividing, from the intermediate image, pixels representing shape information, for example, information indicating a shape or a boundary of an object, and pixels not representing the shape information. The threshold value determination unit 130 may adaptively determine the first threshold value based on the distribution of the pixel value for the pixels of the intermediate image, and an optimal first threshold value may be deduced automatically from a result of the clustering.

For example, the threshold value determination unit 130 may represent the intermediate image as a histogram, and determine the first threshold value by clustering the pixels of the intermediate image configuring the histogram into two groups. The threshold value determination unit 130 may cluster the pixels of the intermediate image into two groups, using such as a K-means clustering algorithm, for example. The threshold value determination unit 130 may cluster pixels of the histogram into two groups in which a dispersion is minimized, through the K-means clustering algorithm. Accordingly, a group of pixels to be clustered may differ based on the distribution of the pixels of the intermediate image, and the first threshold value to be applied to the intermediate image may also differ in the K-means clustering algorithm. An optimal first threshold value to be applied to the intermediate image may be deduced automatically from a result using the K-means clustering algorithm.

According to other embodiments, the threshold value determination unit 130 may remove pixels of a predetermined brightness having a fewer number of pixels than a number of pixels of a preset threshold value, hereinafter a "second threshold value", from the histogram of the intermediate image, and perform a clustering.

For example, the threshold value determination unit 130 may exclude the pixels of the predetermined brightness having a fewer number of pixels than the number of pixels of the second threshold value in the histogram of the intermediate image from a process of determining the first threshold value. The threshold value determination unit 130 may determine the first threshold value to be applied to the intermediate image through clustering remaining pixels, subsequent to excluding the pixels of the predetermined brightness. The threshold value determination unit 130 may determine the first threshold value optimized for an image property, through filtering object pixels for detecting an edge area, based on the second threshold value.

The edge area detection unit 140 may detect an edge area from the intermediate image based on the first threshold value determined by the threshold value determination unit 130. As a result, the edge area detection unit 140 may divide an edge area and a background area in the intermediate image, thereby generating a binary image.

The edge area detection unit 140 may detect an edge area from the intermediate image through comparing the first threshold value and a pixel value for the pixels of the intermediate image. For example, the edge area detection unit 140 may divide the pixels of the intermediate image into two groups through clustering in the histogram of the intermediate image, and determine an edge area and a background area based on the divided groups of the pixels and the first threshold value. In more detail, the edge area detection unit 140 may determine a group of pixels having a pixel value greater than the first threshold value to be the edge area, and determine a group of pixels having a pixel value less than the first threshold value to be the background area. The pixels having a pixel value equal to the first threshold value may be determined either to be the background area or the edge area, based on a selection of a user.

The edge area detection unit 140 may assign a value of zero to the pixels of the determined edge area to be represented as dark in a resulting image, and assign a value of "1" to the pixels of the determined background area to be represented as bright in the resulting image, thereby generating a binary image representing a shape or a boundary of an object.

The edge area detection unit 140 may correct the resulting image based on a number of pixels configuring the edge area in the resulting image from which the edge area is detected. The edge area detection unit 140 may correct the resulting image, such that the edge area may be represented more clearly, based on a degree of noise of the resulting image or a selection of a user.

For example, the edge area detection unit 140 may remove independent edge areas configured by a fewer number of pixels than a number of pixels of a preset threshold value, hereinafter referred to as a "third threshold value", from the resulting image from which the edge area is detected. The independent edge areas configured by a fewer number of pixels may be represented as a point or a short line irrelevant to a shape or a boundary of an object, thereby represented as the noise of the resulting image.

The edge area detection unit 140 may compare the number of pixels configuring the edge area and the third threshold value, and determine the edge area configured by a fewer number of pixels than the number of pixels of the third threshold value to be noise so as to remove the noise. The edge area detection unit 140 may detect the edge area more accurately through correcting the resulting image, and accentuate a relatively more important edge area.

Figure 2:
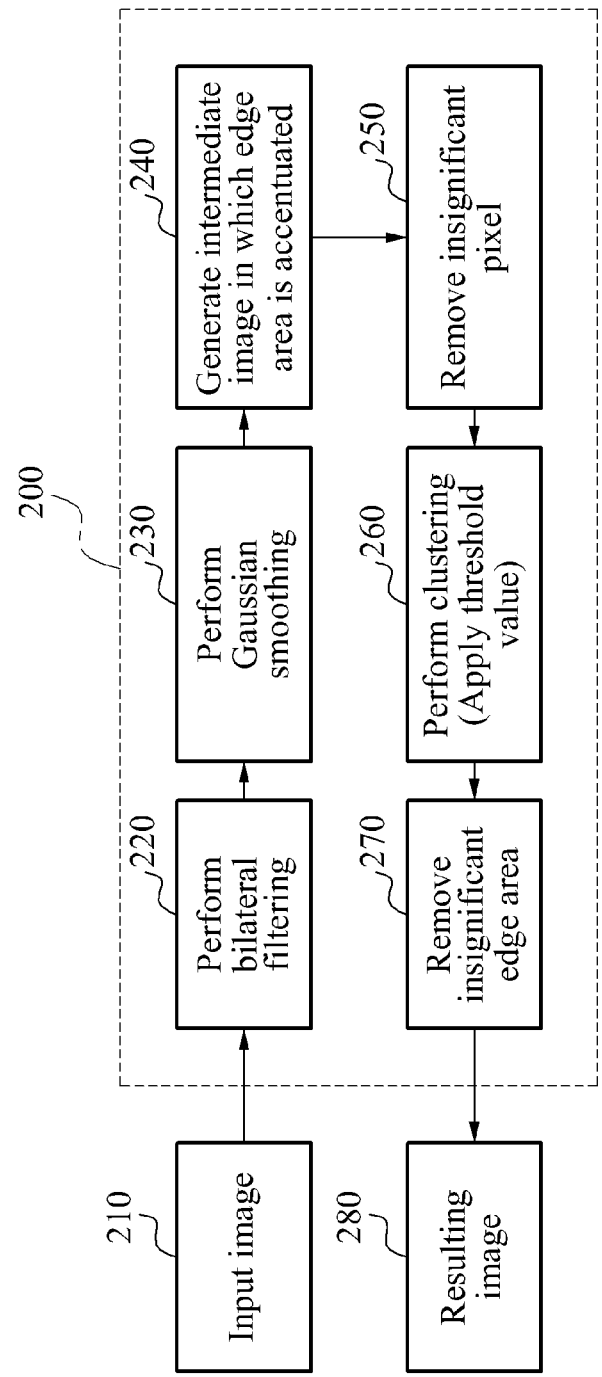
FIG. 2 illustrates an example of a process of detecting an image edge from an input image according to example embodiments.

FIG. 2 illustrates an example of a process 200 of detecting an image edge from an input image according to example embodiments. In the process 200, an apparatus for detecting an image edge detects an edge area from an input image 210, and generates a resulting image 280.

The apparatus for detecting the image edge may perform a bilateral filtering 220 on the input image 210, and remove noise while preserving the edge area of the input image 210. The apparatus for detecting the image edge may determine a weight based on a location of a pixel and a pixel value of the input image 210 through the bilateral filtering 220, and apply the determined weight to pixels of the input image 210.

Subsequently, the apparatus for detecting the image edge may perform a Gaussian smoothing 230 on the input image 210 on which the bilateral filtering 220 is performed. The apparatus for detecting the image edge may additionally remove noise present in the input image 210 through the Gaussian smoothing 230. As a result of performing the Gaussian smoothing 230, the edge area may be accentuated more in the input image 210, and features of areas irrelevant to the edge area may be reduced.

The apparatus for detecting the image edge may generate 240 an intermediate image in which the edge area is accentuated, using the input image on which the bilateral filtering 220 is performed and the input image on which the Gaussian smoothing 230 is performed. The apparatus for detecting the image edge may divide a pixel value of the input image on which the bilateral filtering 220 is performed and a pixel value of the input image on which the Gaussian smoothing 230 is performed, and calculate a ratio between the pixel values of the input images, thereby generating 240 the intermediate image representing the calculated ratio of the pixel values. Transitively, the apparatus for detecting the image edge may represent the edge area darker, and represent the background area brighter, thereby accentuating the edge area.

The apparatus for detecting the image edge may perform a clustering 260 to generate a resulting image, for example, a binary image, when the intermediate image is generated 240. The apparatus for detecting the image edge may remove 250 insignificant pixels from an object to be clustered, prior to performing the clustering 260. For example, the apparatus for detecting the image edge may remove pixels of a predetermined brightness having a fewer number of pixels than a number of pixels of a preset threshold value, hereinafter referred to as a "second threshold value", from a histogram of the intermediate image. The second threshold value may be determined by a user, or determined based on a property of the input image 210.

The apparatus for detecting the image edge may remove 250 the insignificant pixels from the intermediate image, and determine a first threshold value to be applied to the intermediate image. An optimal first threshold value to be applied to the intermediate image may be deduced automatically from the clustering 260. The apparatus for detecting the image edge may divide the pixels of the intermediate image into two groups in the histogram of the intermediate image, and determine a pixel value to be used as a reference for dividing the two groups to be the first threshold value, using a K-means clustering algorithm.

The apparatus for detecting the image edge may detect the edge area by comparing pixel values of pixels in the first threshold value and the intermediate image. The apparatus for detecting the image edge may determine pixels having a pixel value greater than the first threshold value to be a background area, and determine pixels having a pixel value less than the first threshold value to be an edge area, thereby generating a binary image. Pixels having a pixel value equal to the first threshold value may be determined to be the background area or the edge area, based on a selection of a user.

The apparatus for detecting the image edge may remove 270 an insignificant edge area from the binary image to enhance an accuracy of detecting an edge. The apparatus for detecting the image edge may remove edge areas configured by a fewer number of pixels than a number of pixels of a preset threshold value, hereinafter referred to as a "third threshold value", from the binary image representing the edge area and the background area. Transitively, the apparatus for detecting the image edge may remove noise, such as a point, and a short line, for example, irrelevant to the edge area from the binary image.

The apparatus for detecting the image edge may generate the resulting image 280 intuitive to a viewpoint of a user and from which an image edge is detected more accurately through the process 200 of detecting the image edge.

In the process 200 of detecting the image edge, the bilateral filtering 220, the removing 250 of the insignificant pixel, and the removing 270 of the insignificant edge area may be performed selectively, and whether the operations 220, 250, and 270 are to be performed may be determined based on an intention of the user or properties of the input image 210. When the bilateral filtering 220 is not performed, the apparatus for detecting the image edge may generate 240 an intermediate image using the input image 210 and the input image on which the Gaussian smoothing 230 is performed. In more detail, the apparatus for detecting the image edge may generate 240 the intermediate image representing a ratio between a pixel value of the input image 210 and a pixel value of the input image on which the Gaussian smoothing 230 is performed.

The disclosure may be embodied in many different forms and should not be construed as being limited to the embodiments set forth herein. Rather, these embodiments are provided so that the detailed scheme and process represented in FIG. 2 will be thorough and complete, and will fully convey the concept of the invention to those skilled in the art.

Figure 3:
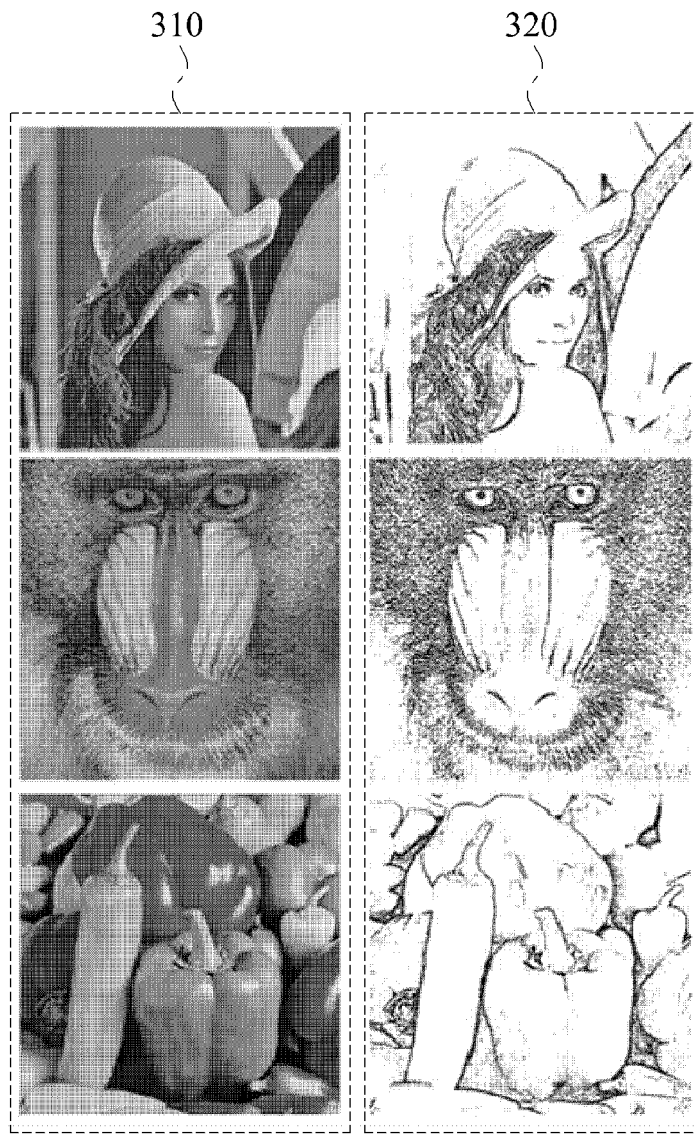
FIG. 3 illustrates an example of a result of detecting an image edge outputted via a method of detecting an image edge according to example embodiments.

FIG. 3 illustrates an example of a result of detecting an image edge outputted via a method of detecting an image edge according to example embodiments.

Referring to FIG. 3, a resulting image 320 may represent a result of detecting an edge area from input images 310 through the provided method of detecting the image edge. When the resulting image 320 are compared to the input images 310, an edge area similar to a shape of an object included in the input images 310 may be detected through the provided method of detecting the image edge. The shape of the object may be intuitively perceived from the resulting image 320.

Figure 4:
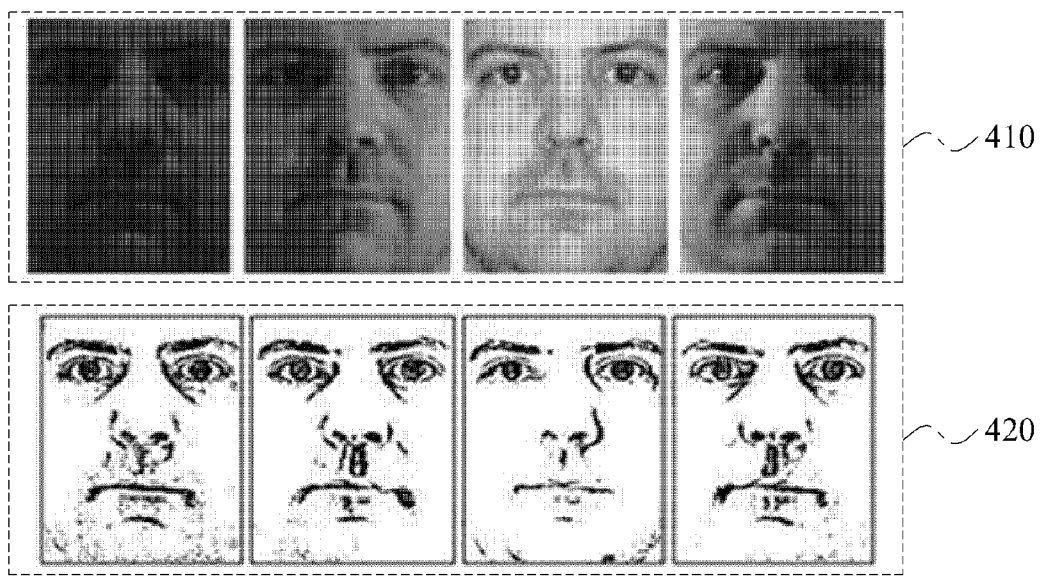
FIG. 4 illustrates an example of a result of detecting an image edge based on a brightness change of an input image according to example embodiments.

FIG. 4 illustrates an example of a result of detecting an image edge based on a brightness change of an input image according to example embodiments.

Referring to FIG. 4, input images 410 having differing brightness, and a resulting image 420 generated by detecting an edge area from the input images 410 using a method of detecting an image edge provided are illustrated.

When the input images 410 and the resulting image 420 using the provided method of detecting the image edge are compared to one another, the provided method of detecting the image edge may be more suitable for detecting an edge area accurately even in a condition in which brightness of the input images 410 changes or an illumination condition of an object to be detected changes. Also, the resulting image 420 shows that the method of detecting the image edge may be used to detect an edge area efficiently for a condition in which the brightness of the input images 410 changes or the illumination condition of the object to be detected changes.

Figure 5:
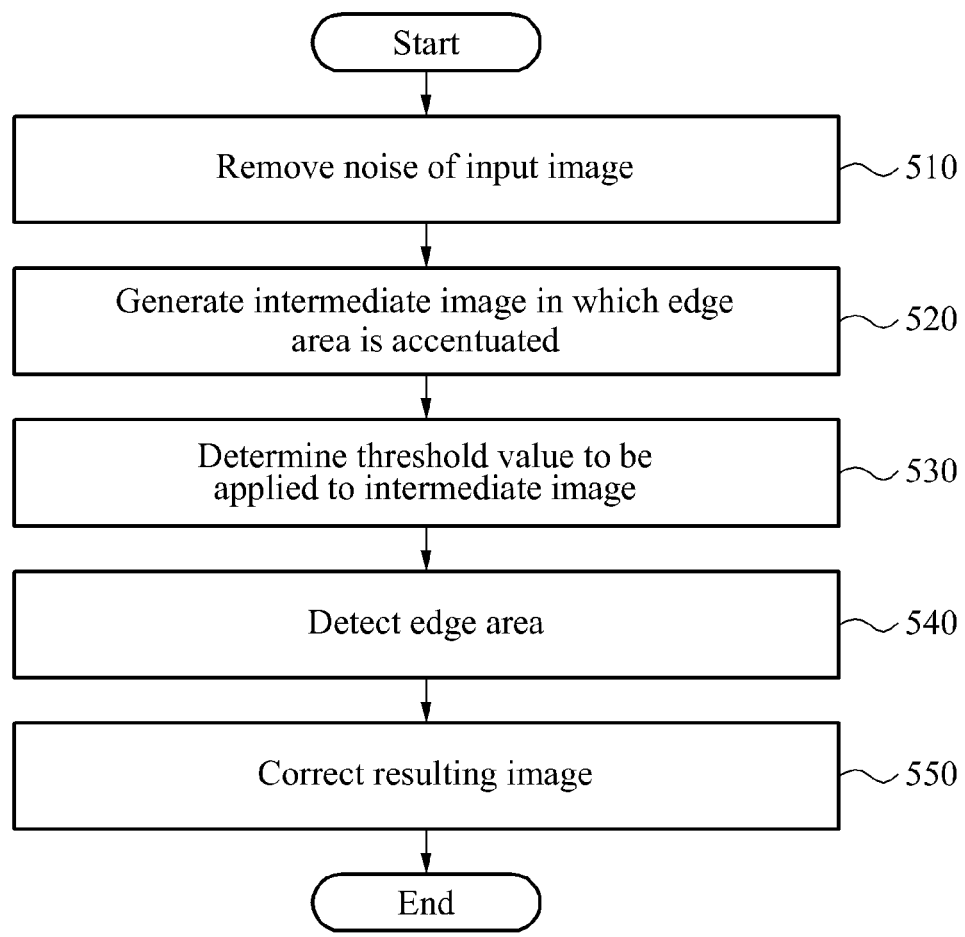
FIG. 5 illustrates an operation of a method of detecting an image edge according to example embodiments.

FIG. 5 illustrates an operation of a method of detecting an image edge according to example embodiments.

In operation 510, an apparatus for detecting an image edge may remove noise from an input image. For example, the apparatus for detecting the image edge may remove the noise of the input image through a Gaussian smoothing scheme using a Gaussian distribution. The apparatus for detecting the image edge may accentuate an edge area of the input image through the Gaussian smoothing scheme, and reduce features of areas irrelevant to the edge area.

In operation 520, the apparatus for detecting the image edge may generate an intermediate image in which an edge area is accentuated based on the input image and the input image from which the noise is removed. The apparatus for detecting the image edge may generate an intermediate image representing a ratio between a pixel value of the input image and a pixel value of the input image from which the noise is removed.

For example, the apparatus for detecting the image edge may divide the pixel values corresponding to the input image and the input image from which the noise is removed, and generate the intermediate image. The apparatus for detecting the image edge may divide the input image and the input image from which the noise is removed pixel-wise, and generate the intermediate image through dividing the pixel values of the pixels corresponding to the input image and the input image from which the noise is removed. The apparatus for detecting the image edge may accentuate not only edge areas but also areas adjacent to the edge areas in the input image through such a process.

In operation 530, the apparatus for detecting the image edge may determine a first threshold value to be applied to the intermediate image through clustering pixels of the intermediate image. The apparatus for detecting the image edge may determine the first threshold value adaptively based on a distribution of a pixel value for the pixels of the intermediate image, and an optimal first threshold value may be deduced automatically from a result of the clustering. For example, the apparatus for detecting the image edge may divide the pixels of the intermediate image into two groups in a histogram of the intermediate image, and determine the first threshold value to be used as a reference for dividing the two groups, using a K-means clustering algorithm.

The apparatus for detecting the image edge may remove pixels of a predetermined brightness having a fewer number of pixels than a number of pixels of a preset threshold value, hereinafter referred to as a "second threshold value", from the histogram of the intermediate image, and perform the clustering. The apparatus for detecting the image edge may determine the first threshold value to be applied to the intermediate image through clustering pixels remaining subsequent to removing the pixels of the predetermined brightness.

In operation 540, the apparatus for detecting the image edge may detect the edge area to from the intermediate image, based on the first threshold value. The apparatus for detecting the image edge may detect the edge area through comparing the first threshold value and pixel values of the pixels of the intermediate image. For example, the apparatus for detecting the image edge may determine pixels having a pixel value greater than the first threshold value to be a background area, and determine pixels having a pixel value less than the first threshold value to be an edge area, thereby generating a binary image.

In operation 550, the apparatus for detecting the image edge may correct a resulting image, based on a number of pixels configuring the edge area in the resulting image from which the edge area is detected. The apparatus for detecting the image edge may remove an insignificant edge area from the resulting image to enhance an accuracy of detecting the edge area. The apparatus for detecting the image edge may remove edge areas configured by a fewer number of pixels than a number of pixels of a preset threshold value, hereinafter referred to as a "third threshold value", from a resulting image representing an edge area and a background area. Transitively, the apparatus for detecting the image edge may remove noise, such as a point, and a short line, for example, irrelevant to the edge area from the resulting image.

Figure 6:
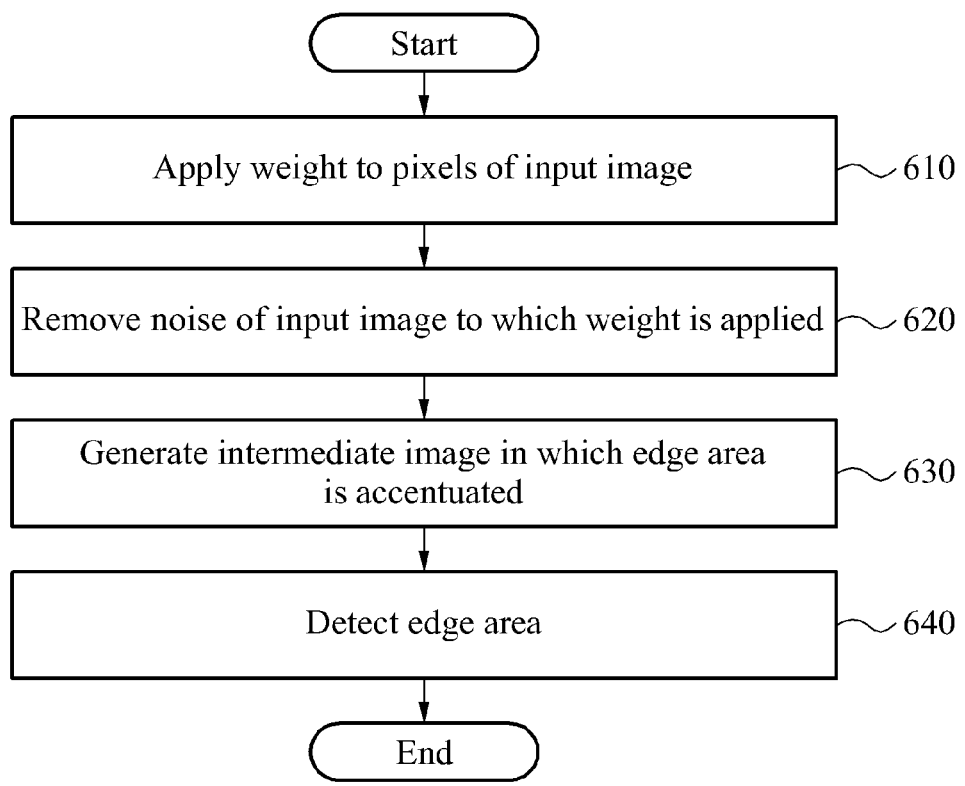
FIG. 6 illustrates an operation of a method of detecting an image edge according to other example embodiments.

FIG. 6 illustrates an operation of a method of detecting an image edge according to other example embodiments.

In operation 610, the apparatus for detecting the image edge may apply a weight determined based on a location of a pixel and a pixel value of the input image to pixels of an input image. For example, the apparatus for detecting the image edge may perform a bilateral filtering on the input image. The apparatus for detecting the image edge may remove noise while preserving the edge area of the input image through the bilateral filtering.

In operation 620, the apparatus for detecting the image edge may remove the noise of the input image to which the pixels the weight is applied. For example, the apparatus for detecting the image edge may remove the noise of the input image through a Gaussian smoothing scheme, using a Gaussian distribution. The apparatus for detecting the image edge may remove the noise using the Gaussian smoothing scheme, and adjust the input image for the edge area to be detected more readily.

In operation 630, the apparatus for detecting the image edge may generate an intermediate image in which an edge area is accentuated based on the input image to which the pixels the weight is applied and the input image from which the noise is removed using the Gaussian distribution. For example, the apparatus for detecting the image edge may divide a pixel value of the input image on which the bilateral filtering is performed and a pixel value of the input image on which the Gaussian smoothing scheme is performed, and calculate a ratio between the pixel values, thereby generating an intermediate image representing the calculated ratio between the pixel values.

In operation 640, the apparatus for detecting the image edge may detect an edge area from the intermediate image, based on a distribution of a pixel value of the intermediate image. For example, the apparatus for detecting the image edge may cluster pixels of the intermediate image using a histogram representing the distribution of the pixel value of the intermediate image, and determine a first threshold value required for generating a binary image. The first threshold value may be determined automatically based on the distribution of the pixel value of the input image through a K-means clustering algorithm. The apparatus for detecting the image edge may divide pixels of the intermediate image into two groups based on the determined first threshold value, and determine the divided groups of the pixels to be an edge area and a background area, respectively. The apparatus for detecting the image edge may generate a binary image representing a shape and a boundary of an object, based on the determined edge area and the background area.

A portable device as used throughout the present specification includes mobile communication devices, such as a personal digital cellular (PDC) phone, a personal communication service (PCS) phone, a personal handy-phone system (PHS) phone, a Code to Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (for example, a global positioning system), and the like. Also, the portable device as used throughout the present specification includes a digital camera, a plasma display panel, and the like.

The method of detecting the image edge according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of detecting an image edge, the method comprising:
   removing noise of an input image;
   generating an intermediate image in which an edge area is accentuated based on the input image and the input image from which the noise is removed;
   determining a threshold value to be applied to the intermediate image through clustering pixels of the intermediate image; and
   detecting an edge area from the intermediate image, based on the threshold value.

2. The method of claim 1, wherein the removing comprises:
   removing noise of an input image, using a Gaussian distribution.

3. The method of claim 1, wherein the generating comprises:
   generating an intermediate image representing a ratio between a pixel value of the input image and a pixel value of the input image from which the noise is removed.

4. The method of claim 1, wherein the determining comprises:
   determining a threshold value adaptively based on a distribution of a pixel value for the pixels of the intermediate image.

5. The method of claim 1, wherein the determining comprises:
   determining a pixel value to be used for dividing the pixels of the intermediate image into two groups, based on the distribution of the pixel value of the intermediate image to be a threshold value to be applied to the intermediate image.

6. The method of claim 1, wherein the determining comprises:
   removing pixels of a intensity having a fewer number of pixels than a threshold value in a histogram of the intermediate image; and
   determining a threshold value to be applied to the intermediate image through clustering remaining pixels, aside from the pixels of the intensity.

7. The method of claim 1, wherein the detecting comprises:
   detecting an edge area from the intermediate image through comparing the threshold value and the pixel value for the pixels of the intermediate image.

8. The method of claim 1, wherein the detecting comprises:
   determining a group of pixels having a pixel value greater than the threshold value to be an edge area, and determining a group of pixels having a pixel value less than the threshold value to be a background area.

9. The method of claim 1, further comprising:
   correcting a resulting image based on a number of pixels configuring the edge area in the resulting image from which the edge area is detected.

10. The method of claim 9, wherein the correcting comprises:
    removing independent edge areas configured by a fewer number of pixels than a threshold value from the resulting image.

11. The method of claim 1, further comprising:
applying a weight based on a location of a pixel of a plurality of pixels and a pixel value of the input image to the plurality of pixels of the input image, and
wherein the removing includes removing noise of the input image to which the weight is applied.

12. An apparatus for detecting an image edge, the apparatus comprising:
a noise removing unit configured to remove noise of an input image;
an intermediate image generation unit configured to generate an intermediate image in which an edge area is accentuated; based on the input image and the input image from which the noise is removed;
a threshold value determination unit configured to determine a threshold value to be applied to the intermediate image through clustering pixels of the intermediate image; and
an edge area detection unit configured to detect an edge area from the intermediate image based on the threshold value.

13. The apparatus of claim 12, wherein the intermediate image generation unit is configured to generates an intermediate image representing a ratio between the pixel value of the input image and a pixel value of the input image from which the noise is removed.

14. The apparatus of claim 12, wherein the threshold value determination unit is configured to determines a threshold value adaptively based on a distribution of a pixel value for the pixels of the intermediate image.

15. The apparatus of claim 12, wherein the edge area detection unit is configured to detects an edge area from the intermediate image through comparing the threshold value and a pixel value for the pixels of the intermediate image.

16. The apparatus of claim 12, wherein the edge area detection unit is configured to removes independent edge areas configured by a fewer number of pixels than a threshold value in a resulting image from which the edge area is detected.

* * * * *